US006406675B1

(12) United States Patent
Small

(10) Patent No.: US 6,406,675 B1
(45) Date of Patent: Jun. 18, 2002

(54) METHOD FOR REDUCING CYANIDE CONSUMPTION DURING PROCESSING OF GOLD AND SILVER ORES TO REMOVE BASE METALS

(75) Inventor: Terrence P. Small, Aldan, PA (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/660,975

(22) Filed: Sep. 13, 2000

(51) Int. Cl.⁷ .......................... C22B 11/00; B01D 11/00
(52) U.S. Cl. ............................ 423/29; 423/31
(58) Field of Search ............................ 423/29, 30, 31; 75/744

(56) References Cited

U.S. PATENT DOCUMENTS

| | | | |
|---|---|---|---|
| 4,274,599 A | 6/1981 | Manfroy et al. ............. 241/16 |
| 4,428,840 A | 1/1984 | Mudder et al. ............. 210/717 |
| 4,528,166 A | 7/1985 | McDougall ................. 423/23 |
| 4,592,779 A | 6/1986 | Russ et al. ................ 75/101 R |
| 4,734,171 A | 3/1988 | Murphy ..................... 204/111 |
| 4,971,625 A | * 11/1990 | Bahr |
| 4,992,097 A | 2/1991 | Fricker ....................... 75/733 |
| 5,061,459 A | * 10/1991 | Bennett et al. |
| 5,187,200 A | 2/1993 | Rainer ........................ 524/30 |
| 5,290,525 A | 3/1994 | Lakshmanan ............... 423/24 |
| 5,336,474 A | * 8/1994 | Diehl et al. |
| 5,368,830 A | * 11/1994 | Alfano et al. ................ 423/29 |
| 5,454,954 A | * 10/1995 | Alfano et al. ............... 210/700 |
| 5,522,997 A | 6/1996 | Virnig et al. ............... 210/638 |
| 5,587,001 A | 12/1996 | De Vries .................... 75/743 |
| 5,910,253 A | 6/1999 | Fuerstenau et al. ......... 210/682 |
| 5,916,534 A | * 6/1999 | Butler |
| 5,961,833 A | 10/1999 | Green et al. ................ 210/638 |

OTHER PUBLICATIONS

F.W. Peterson & J.S.J. Van Deventer, *Chemical Engineering Science*, vol. 46, pp3053–3065, (1991), No Month.

H.G. Linge, Extractive Metallurgy Conference, Oct., 1991, pp. 161–163.

* cited by examiner

*Primary Examiner*—Steven Bos
(74) *Attorney, Agent, or Firm*—Martin F. Sloan

(57) ABSTRACT

A method for reducing consumption of cyanide and level of carbon fouling during cyanide extraction of gold and silver from their ores by treating the ore or aqueous slurry of the ore with a water-soluble sequestering agent for the base metal species for a time sufficient for the sequestering agent to react with at least a portion of the base metal species.

15 Claims, No Drawings

METHOD FOR REDUCING CYANIDE CONSUMPTION DURING PROCESSING OF GOLD AND SILVER ORES TO REMOVE BASE METALS

FIELD OF THE INVENTION

This invention relates to processes for removing base metals during processing of gold and silver ores,

BACKGROUND OF THE INVENTION

Modern techniques for gold and silver recovery depend to the fact that gold and silver dissolve in dilute solutions of cyanide. The broken ore from the mine is first ground to a fine powder in large rotary mills, and the slurry of fine ore and water ("pulp") is treated with cyanide in large tanks that are stirred mechanically or by air-agitation.

In the carbon-in-pulp (CIP) process, activated carbon is used to adsorb the gold or silver directly from the cyanided pulp in a series of large adsorption tanks. Using CIP, the minute but economically important quantities of gold or silver that remain in the barren solutions and solid residues from conventional processing can be recovered.

In the CIP process, pulp flows continuously from the first vessel to the last in series, and the carbon is transferred intermittently by pumping in the opposite (countercurrent) direction. Interstage screens between the tanks prevent the carbon from moving downstream. The gold or silver value of the pulp decreases downstream, and the gold or silver loading on the carbon increases upstream, with the highest value in the first tank. In a variation to this method, termed carbon-in-leach (CIL), leaching and adsorption are carried out in the same series of tanks. Gold or silver is washed from the loaded carbon with a solution of cyanide and caustic soda and then recovered by electrolysis or by precipitation with zinc dust.

Heap leaching was introduced in the 1970's as a means to drastically reduce gold recovery costs. This process takes low grade geological resources and transforms them to the proven ore category. Ore grades as low as 0.01 ounces of gold per ton have been economically processed by heap leaching.

Heap leaching involves placing crushed or run of mine ore in a pile built upon an impervious liner. Cyanide solution is distributed across the top of the pile and the solution percolates down through the pile and leaches out the gold. The gold laden pregnant solution drains out from the bottom of the pile and is collected for gold recovery by either carbon adsorption or zinc precipitation. The barren solution is then recycled to the pile.

Gold and silver ore bodies are often accompanied by base metal complexes, hydroxides and oxides. These contain chiefly copper, iron and calcium species that require additional cyanide and usually additional unit operations in the metal extraction process. The interfering species not only consume cyanide, but also foul the substrate used to extract the precious metal. Carbon and resin are fouled by the presence of iron, copper and calcium in cyanide solutions and pulp. The activated carbon and resin fouled with the undesirable species provide poor extraction efficiency and require extra processing after a precious metal stripping circuit. The extra processing steps consist of acid, caustic and heat additions for effective regeneration. The activated carbon regeneration process also produces a 5–10% loss of material. Therefore, material and precious metal are lost to the tailings pond and seldom recovered.

Thus there is a need for improved methods of removing the base metal species from the precious metal ore bodies during processing.

U.S. Pat. No. 5,290,525 discloses a process for substantially removing base metals and/or cyanide from gold-barren cyanide leachate comprising contacting the leachate with a with a strong base anion exchange resin for a sufficient time to remove the selected base metal, followed by separation of the leachate from the resin.

U.S. Pat. No. 5,587,001 teaches a process for pretreating iron-containing sulfidic ores of precious metals or other such sulfidic rocks with a source of manganate ions prior to lixiviation to form a layer of manganese oxide, thereby reducing the consumption of lixiviation reagents.

U.S. Pat. No. 5,910,253 discloses a method for removing a selected heavy metal ion from an aqueous solution comprising contacting the solution with collophane at a pH effective for capture of the selected heavy metal ion by the collophane.

U.S. Pat. No. 5,961,833 teaches a method for separating gold from copper in a gold ore processing system. In the method, gold ore containing elemental gold and elemental copper is treated with an aqueous cyanide solution to produce a liquid product containing a gold-cyanide complex and a copper cyanide complex. The liquid product is then delivered to a nanofiltration membrane which prevents the copper-cyanide complex from passing through while allowing passage of the gold-cyanide complex. The permeate, which contains the gold-cyanide complex, is then treated to obtain the elemental gold therefrom.

SUMMARY OF THE INVENTION

In one embodiment this invention relates to a method for reducing the consumption of cyanide and level of carbon fouling during the cyanide extraction of gold and silver from ores containing base metal species, comprising treating an aqueous slurry of the ores with a water-soluble sequestering agent for the base metal species for a time sufficient for the sequestering agent to react with the at least a portion of the base metal species.

The invention also relates to a method for the recovery of gold and silver from their ores containing base metal species comprising: a) forming a aqueous slurry of the gold or silver ore; b) contacting the aqueous ore slurry with a sequestering agent for the base metal species for a time sufficient for the sequestering agent to react with at least a portion of the base metal species; c) treating the aqueous ore slurry with an aqueous cyanide solution for a sufficient time for formation of a leach liquor containing gold and silver cyanide complexes; d) treatment of the leach liquor with a sufficient amount of activated carbon to absorb the gold and silver cyanide complexes; and e) recovery of the gold and silver from the activated carbon.

DETAILED DESCRIPTION OF THE INVENTION

The method of the invention will reduce cyanide consumption in the process stream and metal cyanides in the tailings, eliminate the need for unit operations that remove the undesired species, reduce the iron, copper and calcium fouling of activated carbon and resin in the extraction operation, and reduce the consumption of activated carbon and resin due to excessive regeneration. The advantages of the invention are achieved by adding the appropriate treatment before the lixiviant is introduced to the process stream.

If it is added prior to the addition of cyanide, it will complex with or associate with the undesired complexes, hydroxides and/or oxides and will reach equilibrium in the aqueous ore stream. When the cyanide is then added, association with the undesired components is avoided, and the cyanide is more fully utilized for reaction with the precious metals.

The process of the invention can be utilized in heap leaching during heap construction, or in the convention CIP process. In the method, an aqueous slurry of ore containing base metal species is formed and then treated with water soluble sequestering agent for a time sufficient to react with the base metal species. Water soluble sequestering agents for use in the invention are preferably selected from the group consisting of organophosphonic acids, ethylenediamine disuccinic acid, polyacrylic acid, and polymethacrylic acid, and most preferably from the group consisting of organophosphonic acids and ethylenediamine disuccinic acid. Examples of organophosphonic acids which are operable in the invention are hydroxyethylidene diphosphonic acid, triaminomethyl phosphonic acid, aminotri(methylene phosphonic acid), hexamethylenediaminetetra phosphonic acid, 2-phosphonobutane tricarboxylic acid-1,2,4, ethylenediamine tetra(methylene phosphonic acid), diethylenetriamine penta(methylene phosphonic acid), triethylenetetramine hexa(methylene phosphonic acid), aminopropylidene diphosphonic acid, hydroxypropylidene diphosphonic acid, hydroxybutylidene diphosphonic acid, hydroxyhexylidene diphosphonic acid and phosphonohydroxy acetic acid. The most preferred organophosphonic acid is hydroxyethylidene diphosphonic acid.

The process may be conducted by contacting an aqueous solution containing the sequestering agent with the aqueous ore slurry in any way known to the art. Alternatively, it is also possible to add the neat sequestering agent to aqueous ore slurry, in effect forming an aqueous solution in situ. It is preferred that the pH of the ore slurry be adjusted to the alkaline side, generally from about 7 to about 11, before the sequestering agent is added.

The amount of sequestering agent required for a significant reduction of the amount of base metal species in the ore concentrate will depend on the nature of the particular ore to be treated and can easily determined by one skilled in the art without undue experimentation. Generally the amount of sequestering agent used will be from about 0.0001% to about 0.07% on a dry basis based on the wet weight of the ore slurry. The optimum time for treatment with the sequestering agent will also be significantly affected by the nature of the particular ore sample involved. However, it is generally found that in a well agitated system no more than 15 minutes is required for significant reductions in the level of base metal species. Longer times will of course not be harmful After treatment with the sequestering agent of the invention the aqueous ore slurry can be treated with aqueous cyanide solution in any of the ways will known and used in the art for a sufficient time for formation of a leach liquor containing gold and silver cyanide complexes. Treatment of the leach liquor with activated carbon for absorption of the gold and/or silver complexes, and recovery of the gold and silver from the carbon are also techniques well known in the art.

The invention is illustrated by the following examples, which are exemplary only and not intended to be limiting. All percentages, parts, etc. are by weight unless otherwise indicated.

Procedures

The ore used for experimentation was a pulverized Australian gold ore. The materials were tested in a continuously stirred system that simulates the CIP circuit of a commercial ore processing plant. The following procedure was used to characterize treatment efficiency.

The ore pulp, 200 g, 50% solids, was added to a glass vessel. The pH was adjusted to 10.5 with aqueous calcium hydroxide, and then the pulp was agitated with a stainless steel impeller stirrer. Either deionized water (the control) or the treatment material was then added and allowed to associate for 15 minutes. All treatments were fed at a concentration of 2000 ppm dry basis based on the weight of the dry pulp. Then 2 g of barren granular coconut shell activated carbon was slowly added to the pulp. The mixture of pulp, activated carbon, and treatment was stirred for 24 hours to simulate the continuously stirred conditions of the typical absorption circuit. At the end of this time the pulp and activated carbon slurry were separated with a 30 mesh screen. The residual pulp was rinsed from the activated carbon with deionized water. The activated carbon was further rinsed with copious amounts of deionized water and then dried in an environmental chamber overnight.

The dry carbon was pulverized with a mortar and pestle. Then the pulverized material was digested in 50 ml. of 10% hydrochloric acid and filtered. Inductive Coupled Plasma Mass Spectroscopy was used to determine the total iron level in the aqueous filtrate. The results are presented in Table 1. The "% Iron Fouling Reduction" values in the table were calculated by subtracting the iron level found from the iron level found in th control (Example 1) and dividing the result by the iron level found in the control.

TABLE 1

| Example No. | Sequestering Agent | Iron (ppm) | % Iron Fouling Reduction |
| --- | --- | --- | --- |
| 1 (Control) | Deionized water | 1029 | 0 |
| 2 | Ethylenediamine disuccinic acid | 205 | 80 |
| 3 | Hydroxyethylidene diphosphonic acid | 278 | 73 |
| 4 | Polyacrylic acid | 417 | 60 |
| 5 | Polymethacrylic acid | 558 | 46 |
| 6 | Polyisopropenyl phosphonic acid | 669 | 35 |
| 7 | Diethylenetriamine penta(methylene phosphonic acid) | 769 | 25 |

The results presented in the table clearly show that the iron fouling reduction of the carbon black is highest with ethylenediamine disuccinic acid and hydroxyethylidene diphosphonic acid treatments.

The present invention has been discussed herein by reference to certain specific materials and methods. The enumeration of these materials and methods is merely illustrative and in no way constitutes any limitation on the scope of the present invention. It is to be expected that those skilled in the art may discern and practice variations of or alternatives to the specific teachings provided herein without departing from the scope of the present invention.

What is claimed is:

1. A method for reducing the consumption of cyanide and level of carbon fouling during the cyanide extraction of gold and silver from ores containing base metal species, comprising treating an aqueous slurry of the ores with a water-soluble sequestering agent for the base metal species for a time sufficient for the sequestering agent to react with at least a portion of the base metal species, wherein the water-soluble sequestering agent is selected from the group consisting of ethylenediamine disuccinic acid and hydroxyethylidene diphosphonic acid.

2. The method of claim 1 wherein the sequestering agent is added to the aqueous ore slurry before the addition of cyanide to the ore slurry.

3. The method of claim 1 wherein the base metal species are selected from the group consisting of copper, iron, calcium and zinc.

4. The method of claim 1 wherein the sequestering agent comprises ethylenediamine disuccinic acid.

5. The method of claim 1 wherein the sequestering agent comprises hydroxyethylidene diphosphonic acid.

6. A method for the recovery of gold and/or silver from their ores containing base metal species comprising:
   a) forming a aqueous slurry of gold or silver ore;
   b) contacting the aqueous ore slurry with a sequestering agent for the base metal species for a time sufficient for the sequestering agent to react with at least a portion of the base metal species;
   c) treating the aqueous ore slurry with an aqueous cyanide solution for a sufficient time for formation of a leach liquor containing gold or silver cyanide complexes;
   d) treatment of the leach liquor with a sufficient amount of activated carbon or resin to absorb the gold or silver cyanide complexes; and
   e) recovery of the gold or silver from the activated carbon or resin,
   wherein the sequestering agent is selected from the group consisting of ethylenediamine disuccinic acid and hydroxyethylidene diphosphonic acid.

7. The method of claim 6 wherein the sequestering agent comprises ethylenediamine disuccinic acid.

8. The method of claim 6 wherein the sequestering agent comprises hydroxyethylidene diphosphonic acid.

9. The method of claim 6 wherein the base metal species are selected from the group consisting of copper, iron, calcium and zinc.

10. A heap leaching method for the recovery of gold and/or silver from ores containing base metal species comprising:
    a) constructing a pile of crushed ore;
    b) distributing across the top of the pile an aqueous solution of a sequestering agent for the base metal species;
    c) distributing across the top of the pile an aqueous cyanide solution to form leach liquor containing gold or silver cyanide complexes;
    d) recovering the leach liquor that percolates through the pile;
    e) treatment of the leach liquor with a sufficient amount of activated carbon or resin to absorb the gold or silver cyanide complexes; and
    f) recovering the gold or silver from the activated carbon or resin,
    wherein the sequestering agent comprises at least one member selected from the group consisting of hydroxyethylidene diphosphonic acid and ethylenediamine disuccinic acid.

11. The method of claim 10 wherein steps (b) and (c) are carried out simultaneously.

12. The method of claim 10 wherein step (b) precedes step (c).

13. The method of claim 10 wherein the sequestering agent comprises ethylenediamine disuccinic acid.

14. The method of claim 10 wherein the sequestering agent comprises hydroxyethylidene diphosphonic acid.

15. The method of claim 10 wherein the base metal species are selected from the group consisting of copper, iron, calcium and zinc.

* * * * *